United States Patent [19]

Kondo

[11] Patent Number: 5,050,008
[45] Date of Patent: Sep. 17, 1991

[54] TAPE GUIDE APPARATUS HAVING TAPE POSTURE CONTROL POLE

[75] Inventor: Yuji Kondo, Fukaya, Japan

[73] Assignee: Kabushiki Kaisha Toshiba, Kawasaki, Japan

[21] Appl. No.: 457,879

[22] Filed: Dec. 27, 1989

[30] Foreign Application Priority Data

Dec. 27, 1988 [JP] Japan .................. 63-329726

[51] Int. Cl.$^5$ ............................................. G11B 5/027
[52] U.S. Cl. ......................................... 360/85; 360/95
[58] Field of Search ................. 360/85, 95, 130.22, 360/130.23

[56] References Cited

U.S. PATENT DOCUMENTS

| | | |
|---|---|---|
| 3,678,213 | 7/1972 | Sato . |
| 4,059,245 | 11/1977 | Hirose . |
| 4,133,497 | 1/1979 | Rothlisberger . |
| 4,319,292 | 3/1982 | Katoh . |
| 4,370,682 | 1/1983 | Katoh . |
| 4,577,246 | 3/1986 | Matsuki . |
| 4,628,383 | 12/1986 | Miyamoto . |
| 4,642,714 | 2/1987 | Miyamoto . |
| 4,656,540 | 4/1987 | Kodama et al. . |
| 4,723,177 | 2/1988 | Ahn . |
| 4,768,113 | 8/1988 | Sato . |
| 4,809,100 | 2/1989 | Tanaka et al. . |
| 4,825,322 | 4/1989 | Kunze . |
| 4,837,646 | 6/1989 | Nagai .................. 360/85 |
| 4,851,938 | 7/1989 | Inami . |
| 4,858,042 | 8/1989 | Ito . |
| 4,866,549 | 9/1989 | Terayama .................. 360/85 |
| 4,872,076 | 10/1989 | Uehara et al. . |
| 4,918,549 | 4/1990 | Katono et al. . |
| 4,930,720 | 6/1990 | Hwang . |
| 4,951,163 | 8/1990 | Nakamichi .................. 360/95 X |

FOREIGN PATENT DOCUMENTS 0162497 4/1985 European Pat. Off. .
2543345 9/1986 France .

Primary Examiner—A. J. Heinz
Attorney, Agent, or Firm—Cushman, Darby & Cushman

[57] ABSTRACT

A tape posture control pole controls widthwise inclination of a tape. When the tape cassette containing the tape has been loaded at a predetermined loading position, a tape posture control pole-moving mechanism advances the tape posture control pole into an indentation formed in the tape cassette. When the tape has been pulled out of the tape cassette through the indentation, the tape posture control pole-moving mechanism moves the tape posture control pole close to a guide pin formed within the tape cassette substantially in parallel to the guide pin. Simultaneously, the tape posture control pole-moving mechanism brings the tape posture control pole into contact with the inner side of the tape which is pulled out of the tape cassette through the tape-takeout section. In this fashion, the tape posture control pole-moving mechanism causes the tape posture control pole to control the widthwise inclination of the tape.

4 Claims, 9 Drawing Sheets

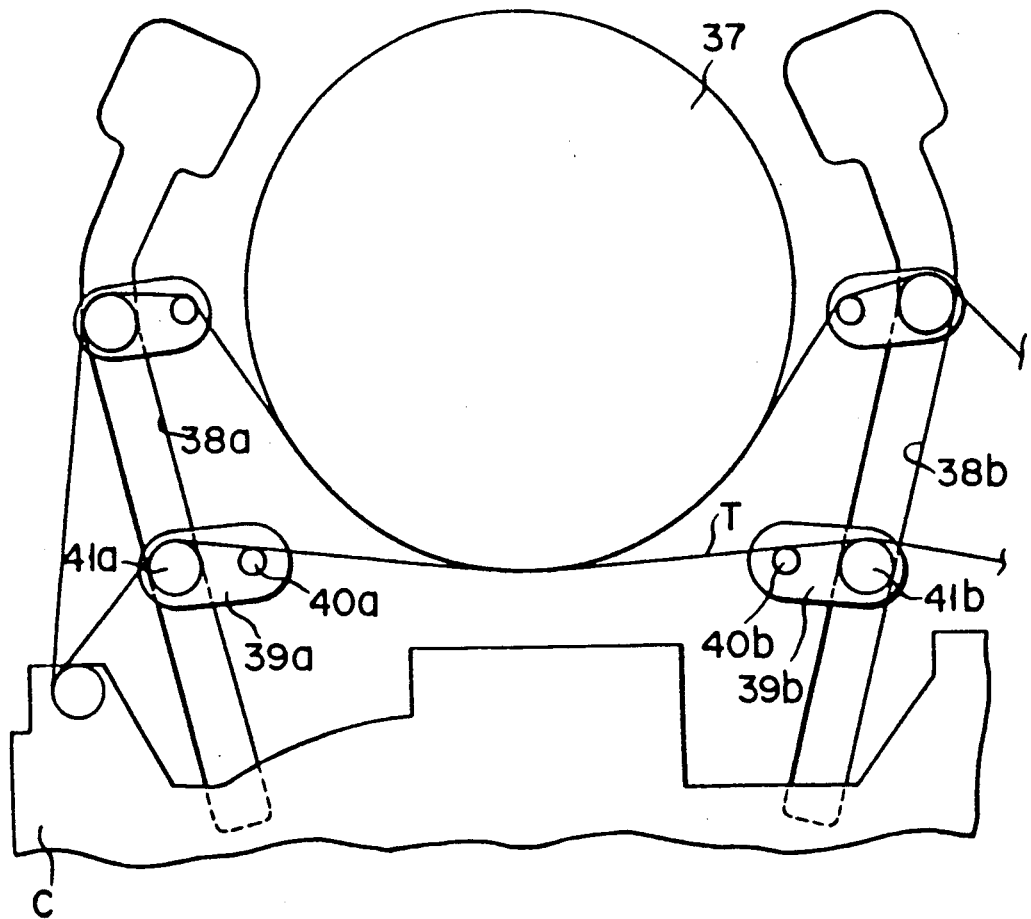
F I G. 4A
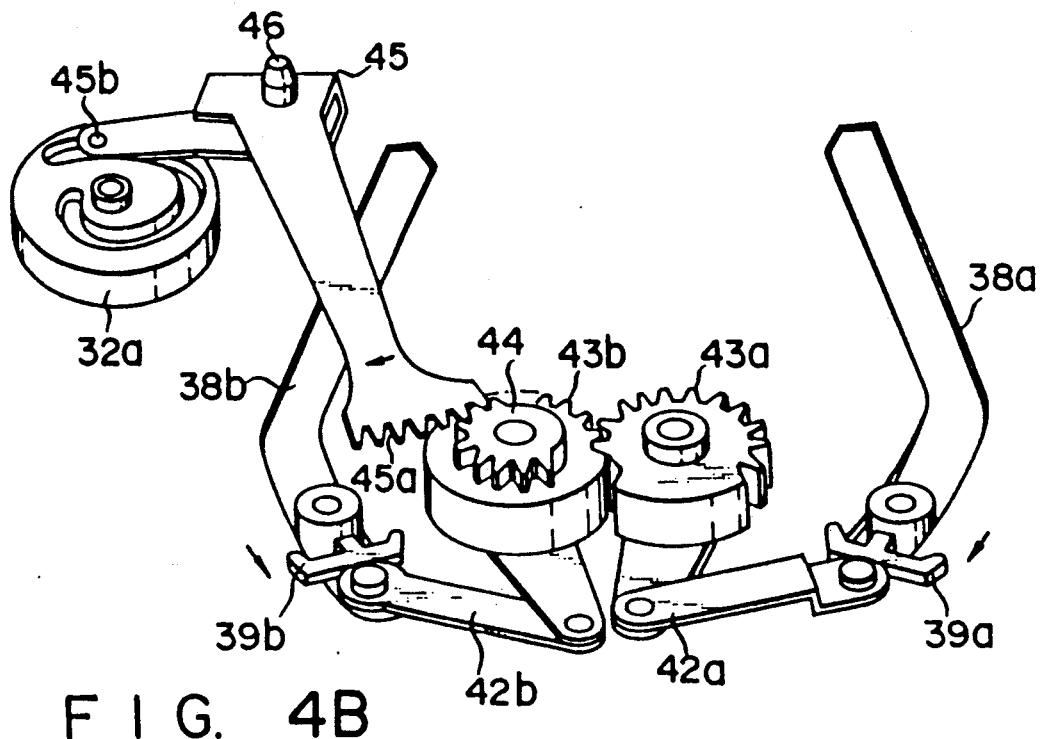
F I G. 4B

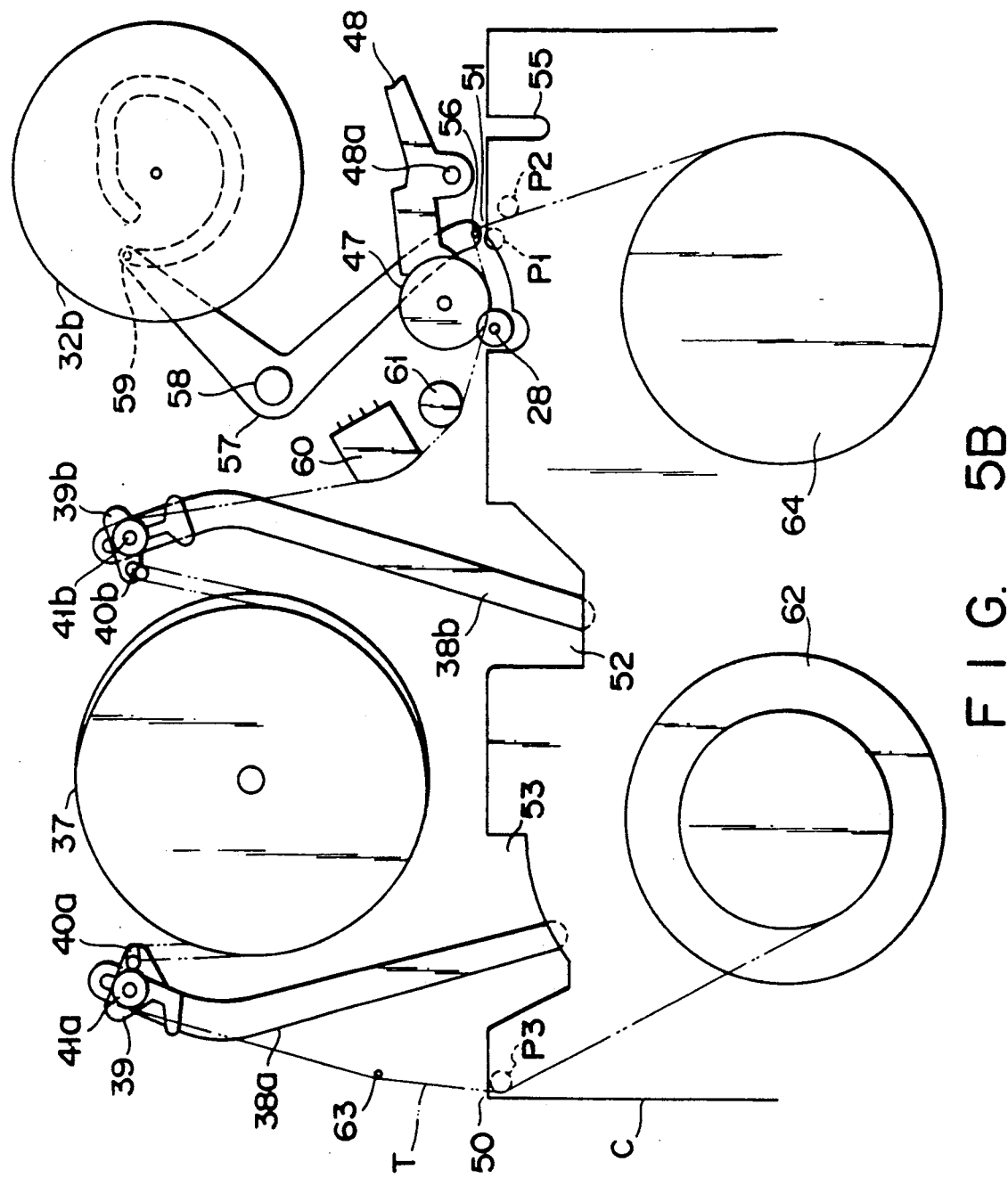
F I G. 5B

TAPE GUIDE APPARATUS HAVING TAPE POSTURE CONTROL POLE

BACKGROUND OF THE INVENTION

1. Field of the Invention

The present invention relates to a tape guide apparatus for use in a video tape recorder (VTR), and more particularly to a tape guide apparatus having a tape posture control pole for maintaining the posture of a video tape in a stable state.

2. Description of the Related Art

As is well known, a helical scan VTR is provided with both a front loading mechanism and a tape-loading mechanism. When a video tape cassette containing a video tape is horizontally inserted into the cassette insertion port formed in the front face of the VTR, the front loading mechanism receives and draws the cassette inside, and then lowers the cassette until it comes to the predetermined cassette-loading position. Thereafter, the tape-loading mechanism pulls the tape out of the cassette placed at the cassette-loading position and guides the tape such that it is in contact with about half of the circumference of the rotating cylinder. After the tape-loading mechanism sets the tape along the tape feed path in this way, various operation modes, such as recording, play, freeze (i.e., still image reproduction), slow play, fast-forward play, fast-rewind play, fast forward, and fast rewind, are selectively established with a mode-establishing mechanism and its associated circuits. If an eject key is operated, the tape-loading mechanism draws the tape back into the cassette, and the front loading mechanism returns the cassette from the cassette-loading position to the cassette insertion port.

FIG. 1 schematically illustrates the state in which the tape pulled out of the cassette is set along the tape feed path while in contact with the rotating cylinder.

As is illustrated in FIG. 1, the feed path of tape T extends from supply reel 1 of cassette C to take-up reel 9 thereof, by way of the following structural elements: tension pole 2; impedance roller 3; tape-pulling pole 4a; rotating cylinder 5; tape-pulling pole 4b; audio and control head 6; capstan shaft 7; and pinch roller 8. Pinch roller 8 is movable between a position at which it is pressed against capstan shaft 7 and a position at which it is located away from capstan shaft 7. More specifically, pinch roller 8 is pressed against capstan shaft 7 when tape T should be fed at a constant speed, and is moved away from capstan shaft 7 when tape T is rewound in the fast-rewind play mode.

A recently-developed VTR has not only an ordinary play function but also special play functions, such as a frame-feed slow play, a fast-forward play, and a fast-rewind play, and is therefore designed to feed tape T in both directions A and B indicated in FIG. 1 while simultaneously maintaining the image-reproducing function. The recently-developed VTR also has a high-speed search function, so as to quickly find the image the user wants to watch.

Tape cassette C has guide pins P1, P2 and P3 formed at tape-takeout ports. In general, these guide pins are not formed with high precision. In some cases, they are flimsy or are slightly titled, with respect to capstan shaft 7. Such flimsy or slanted guide pins are caused not only by their own low precision, but also because the main body of cassette C is formed of synthetic resin. Further, if cassette C is not guided accurately to the loading position, due to scratches or uneven portions thereof, it is likely that the guide pins will be slanted.

If the guide pins, particularly guide pin P1, are not accurately parallel to capstan shaft 7, tape T may not be fed from the supply reel or wound onto the take-up reel with a desirable posture.

Let it be assumed that the VTR is set in the fast-play mode, wherein pinch roller 8 and capstan shaft 7 are located apart from each other and wherein the tape is fed while being driven by the reels. If pin P1 is slanted in this case, tape T guided by pin P1 may slip in the widthwise direction thereof when it comes out of cassette C. If this happens, tape T will be shifted from the normal contact portion of rotating cylinder 5. Since rotating cylinder 5 has a stepped tape guide for guiding the tape edge, it is likely that tape T will be bent or damaged by the stepped tape guide.

Let it be assumed that the VTR is set in the fast-forward mode. If pin P1 is flimsy or slanted in this case, tape T may not be regularly wound onto take-up reel 9, leaving a gap between the adjacent turns of the wound tape. When tape T wound in this manner is used next, it may move in the widthwise direction when it is being fed, thus causing adverse effects on the rewind play mode of the VTR.

SUMMARY OF THE INVENTION

Accordingly, an object of the present invention to provide a tape guide apparatus for use in a VTR, which permits a tape to be pulled out of its cassette and guided in a stable manner and which maintains the posture of the tape in a desirable state.

This object is achieved by a tape guide apparatus which comprises: a tape posture control post for controlling widthwise inclination of a tape; and a tape posture control post-moving mechanism for advancing the posture control post into a tape-takeout section of the tape cassette when the tape cassette containing the tape has been loaded at a predetermined loading position, and for moving the tape posture control post close to a guide post of the tape cassette substantially in parallel to the guide post, and simultaneously bringing the tape posture control post into contact with the inner side of the tape which has been pulled out of the tape cassette through the tape-takeout section when the tape has been pulled out of the tape cassette through the tape-takeout section.

BRIEF DESCRIPTION OF THE DRAWINGS

FIGS. 4A and 4B are top and bottom views, respectively, illustrating a tape-loading mechanism;

FIG. 5B is a plan view showing the operating condition of the tape guide apparatus illustrated in FIG. 5A;

DETAILED DESCRIPTION OF THE PREFERRED EMBODIMENTS

One embodiment of the present invention will now be described, with reference to the accompanying drawings.

Figure 2A:
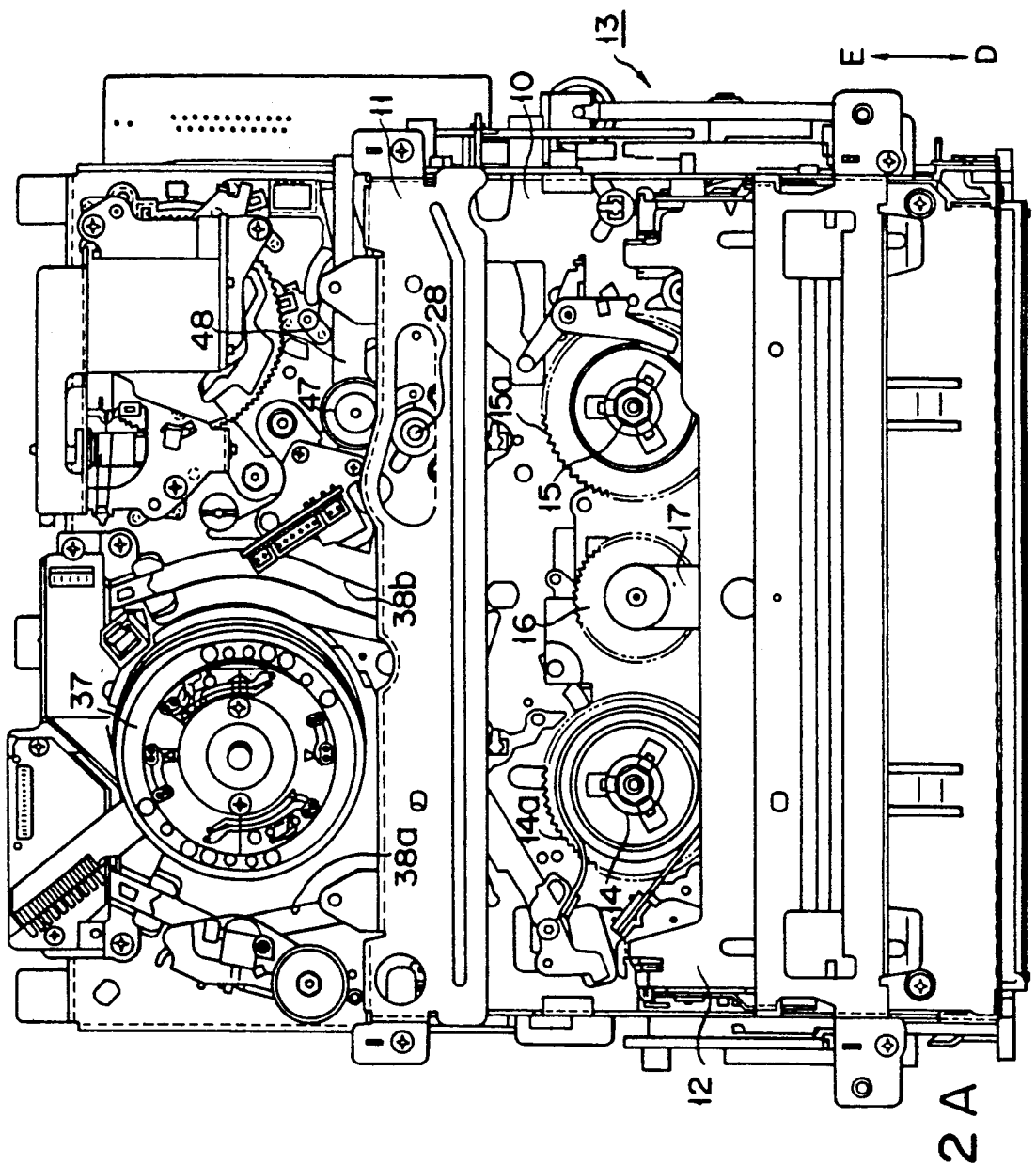
FIG. 2A is a top view of a VTR which incorporates a tape guide apparatus according to one embodiment of the present invention.
Figure 2B:
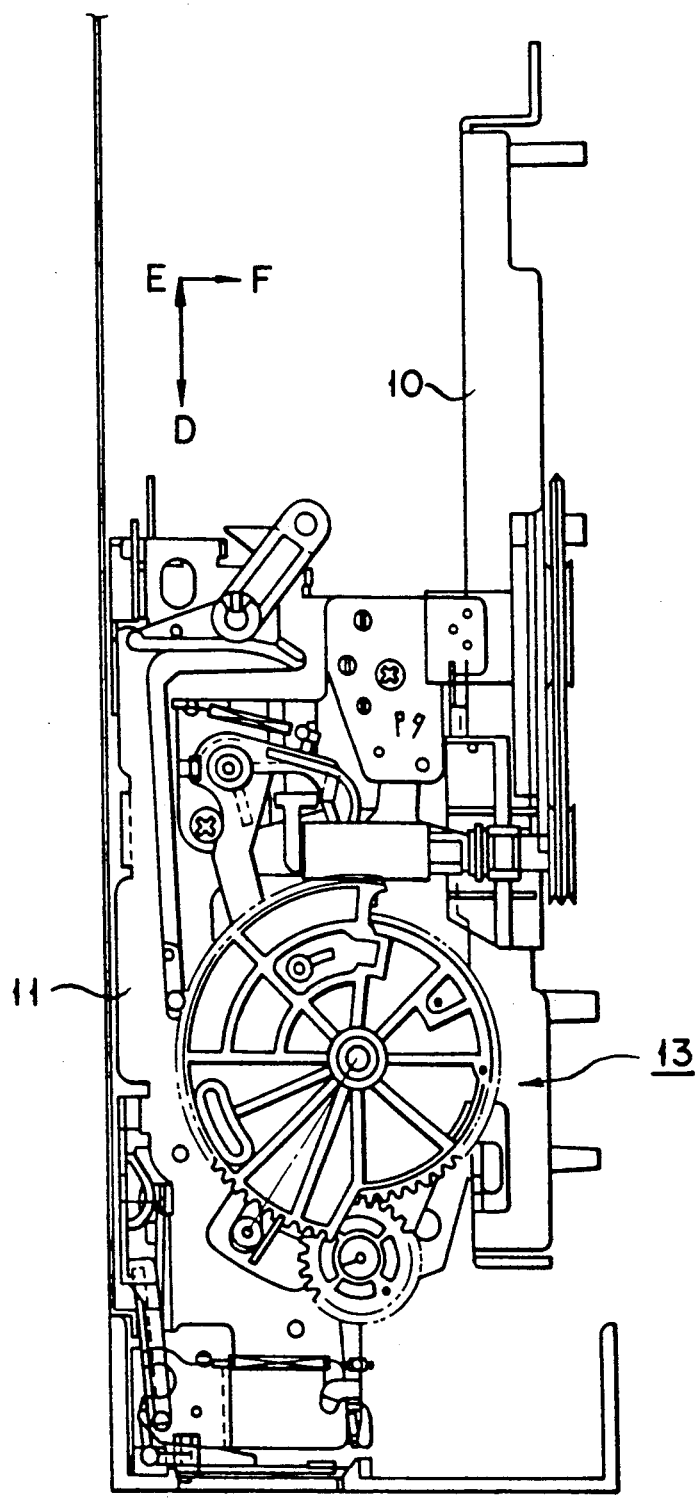
FIG. 2B is a side view of the VTR illustrated in FIG. 2A.
Figure 2C:
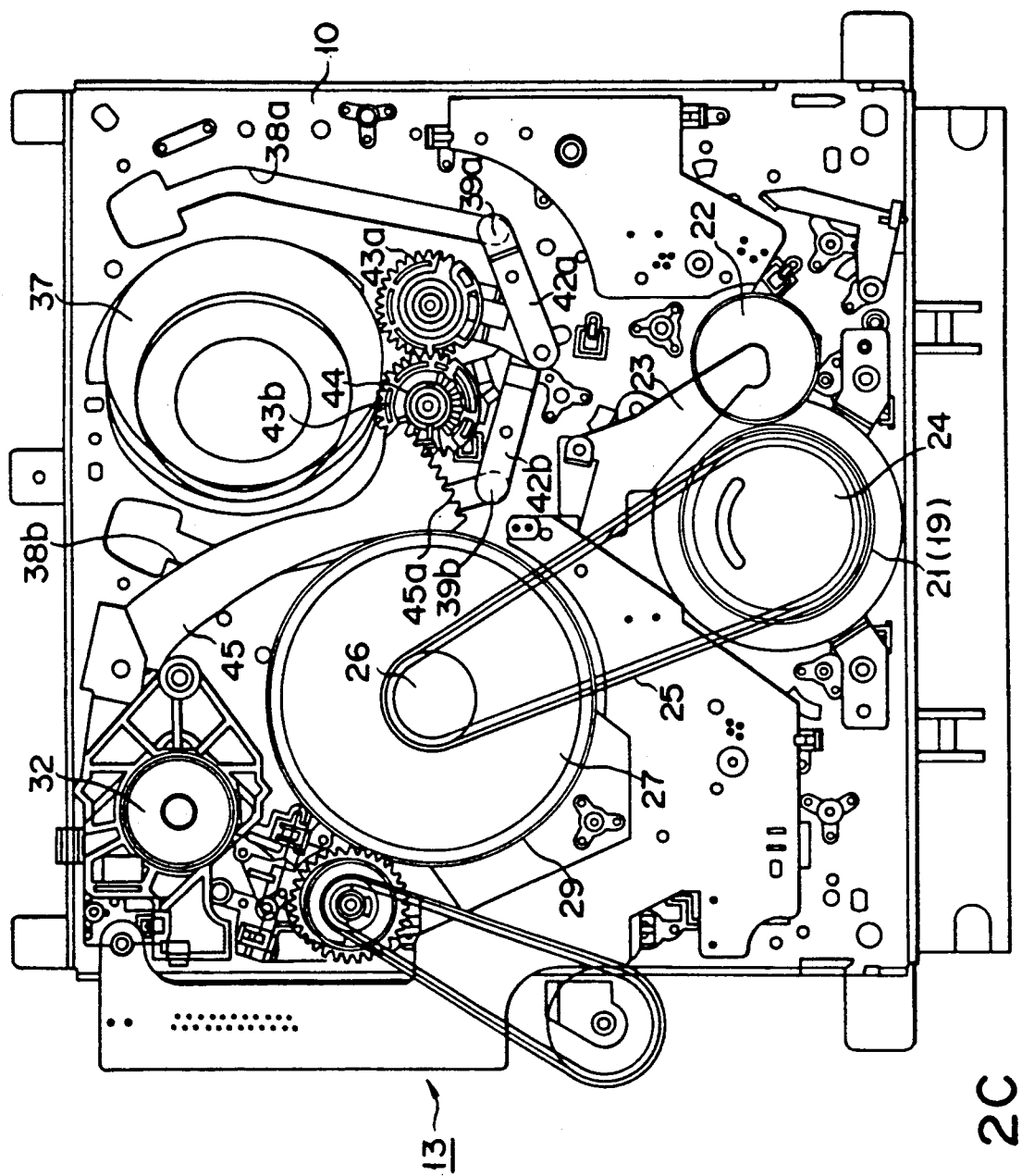
FIG. 2C is a bottom view of the VTR illustrated in FIG. 2A.

FIGS. 2A, 2B and 2C are top, side and bottom views, respectively, of a VTR which incorporates a tape guide apparatus according to one embodiment of the present invention. Referring to the Figures, frame member 11 is coupled to one end of main chassis 10. Cassette holder 12 is supported by frame member 11 such that it is movable in the directions indicated by arrows D, E and F (the direction indicated by arrow F is perpendicular to the directions indicated by arrows D and E). Cassette holder 12 is adapted to receive cassette C (which is not shown in FIGS. 2A, 2B and 2C, for simplicity) when it is located at the cassette insertion port. In response to the insertion of cassette C into cassette holder 12, front loading mechanism 13 is automatically driven. This front loading mechanism moves cassette holder 12 in direction E, together with cassette C inserted therein, until cassette holder 12 reaches a predetermined position. Then, front loading mechanism 13 moves cassette holder 12 in direction F. As a result, cassette C is fitted on supply reel bases 14 and 15, which are parts of a tape-driving mechanism.

Gears 14a and 15a are coupled to reel bases 14 and 15, respectively. Driving gear 16 constituting part of the tape-driving mechanism is located between gears 14a and 15a. This driving gear 16 is supported by one end of swing member 17.

Figure 1:
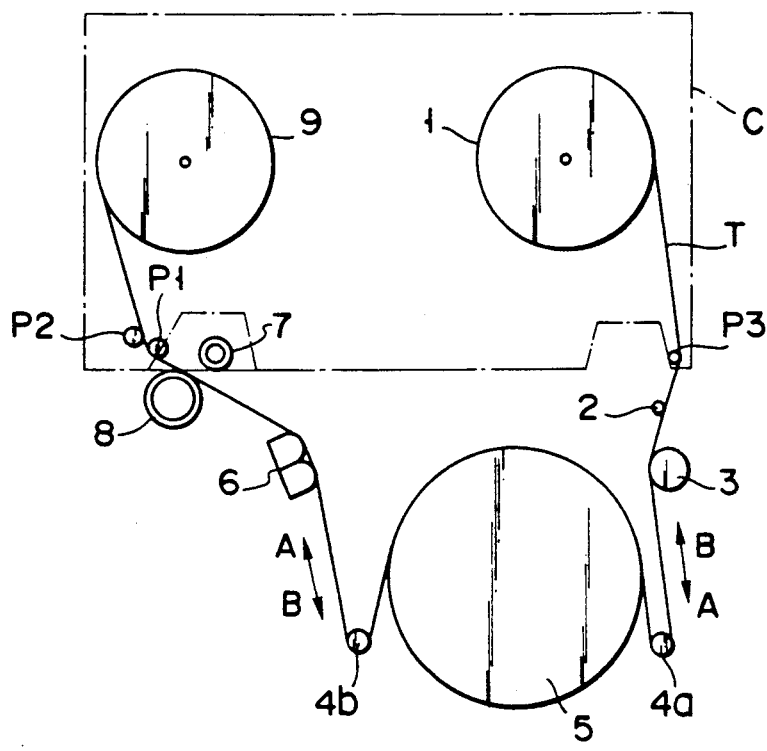
FIG. 1 is a plan view schematically illustrating a conventional tape-driving mechanism.
Figure 3:
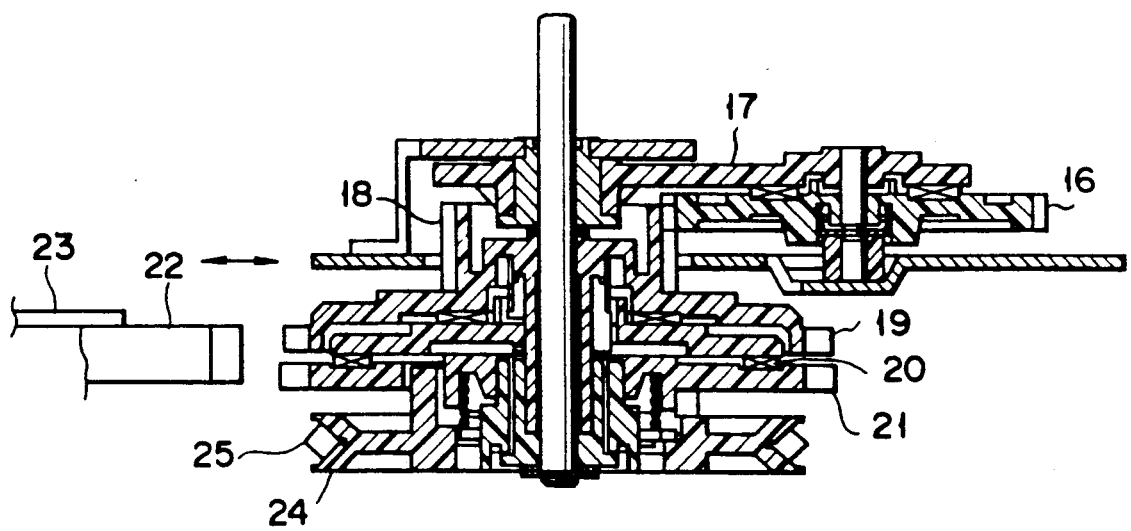
FIG. 3 is a sectional view of a clutch gear mechanism.

As is shown in FIG. 3, gear 18, which is in mesh with driving gear 16, is attached to the other end of swing member 17. First clutch gear 19, which is part of a clutch gear mechanism, is arranged coaxial with gear 18. Second clutch gear 21, which is also part of the clutch gear mechanism, is stacked upon first clutch gear 19, with friction member 20 interposed therebetween. Clutch-switching gear 22 is arranged in such a manner as to face both gears 19 and 21. Clutch-switching gear 22 can be brought into contact with the first and second clutch gears 19 and 21, and can be moved away from them. Clutch-switching gear 22 is swung by changeover slider 23 (which interlocks with an operation mode-switching mechanism), such that it is selectively brought into mesh with both clutch gears 19 and 21. Pulley 24 is arranged coaxial with second clutch gear 21, and driving belt 25 is wound around pulley 24.

As is shown in FIG. 2C, driving belt 25 is wound around driving pulley 26. This driving pulley 26 is fitted on the rotating shaft of capstan motor 27. Therefore, the driving force of capstan motor 27 is transmitted first to pulley 24 via driving belt 25, and then to second clutch gear 21.

As is shown in FIG. 2A, capstan shaft 28 is arranged coaxial with capstan motor 27.

The operation mode-switching mechanism mentioned above comprises a plurality of mode-switching cams (not shown), and loading motor 32 (shown in FIG. 2C) used for rotating the mode-switching cams.

As is shown in FIG. 2A, helical scan type cylinder 37 having magnetic heads (not shown) is rotatably coupled to main chassis 10 mentioned above. Around this cylinder 37, first and second guide holes 38a and 38b (which are parts of a tape-loading mechanism) are provided such that the two guide holes correspond in location to the tape inlet and outlet sides, respectively.

As is shown in FIG. 4A, first and second tape-pulling members 39a and 39b are fitted in first and second guide holes 38a and 38b, respectively, such that they are movable within the guide holes. Slanted post 40a substantially parallel to cylinder 37 and guide roller 41a substantially perpendicular to main chassis 10 are provided for first tape-pulling member 39a such that they are located side by side with reference to each other. Likewise, slanted post 40b substantially parallel to cylinder 37 and guide roller 41b substantially perpendicular to main chassis 10 are provided for second tape-pulling member 39b such that they are located side by side with reference to each other.

As is shown in FIG. 4B, the one-end portions of first and second links 42a and 42b are coupled to the proximal ends of first and second tape-pulling members 39a and 39b, respectively. The other-end portions of first and second links 42a and 42b are supported by first and second driving gears 43a and 43b, respectively, which are in mesh with each other. Half-gear 44 is arranged coaxial with second driving gear 43b. Sectorial gear 45a formed at one end of driving lever 45 is in mesh with half-gear 44. An intermediate point of driving lever 45 is swingably supported by main chassis 10 by means of shaft 46. Pin 45b located at the other end of driving lever 45 engages with the cam groove formed in first mode-switching cam 32a, and this cam 32a is rotated within a predetermined angular range by loading motor 32. Therefore, driving lever 45 is driven by the movement of first mode-switching cam 32a, and transmits the driving force to first and second tape-pulling members 39a and 39b, through half-gear 44, first and second driving gears 43a and 43b, and first and second links 42a and 42b, whereby performing tape loading.

Figure 5A:
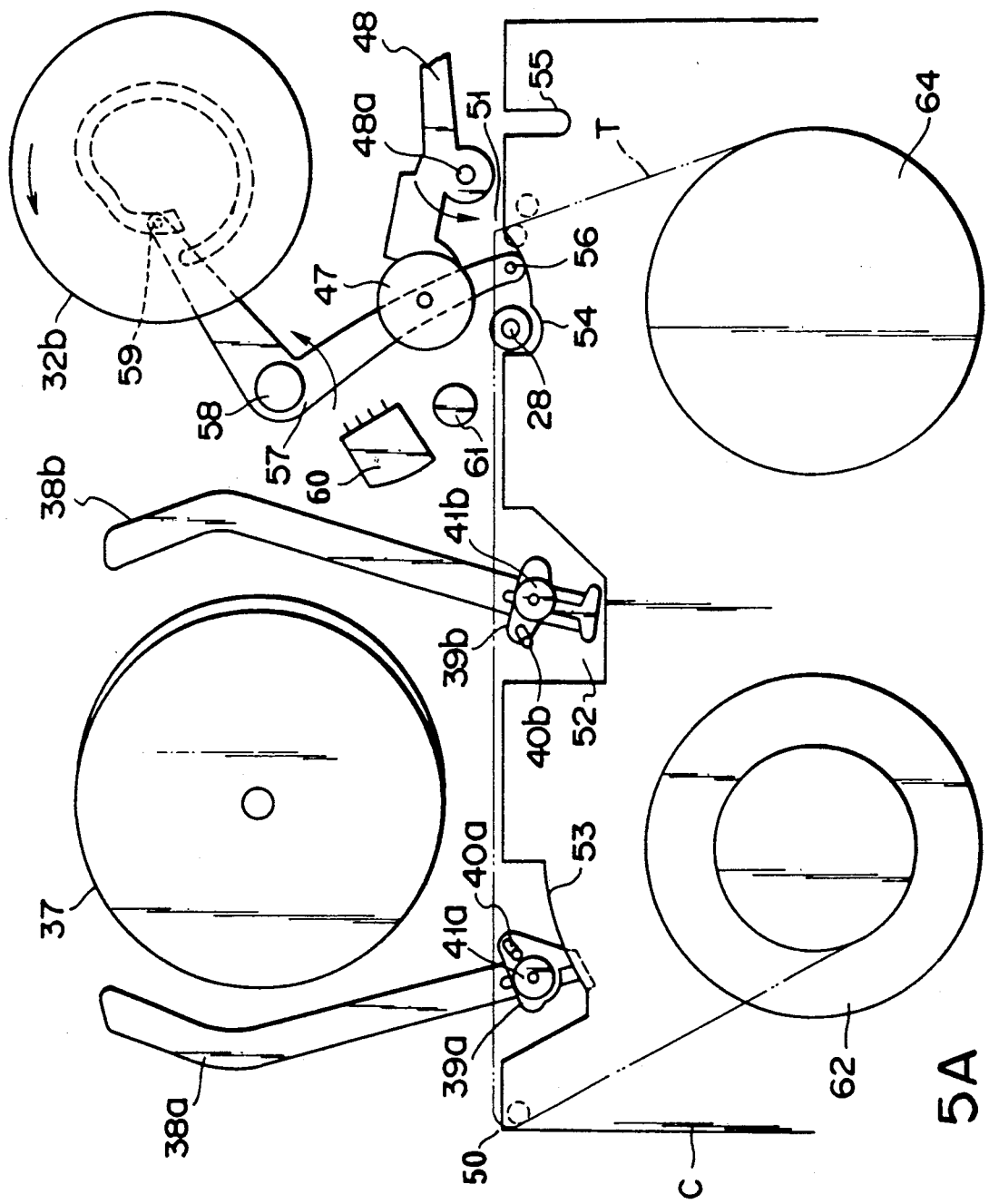
FIG. 5A is a plan view illustrating the construction of the tape guide apparatus of the embodiment.

As is shown in FIG. 2A, pinch roller 47, which is part of the tape-driving mechanism, is arranged on main chassis 10 such that it is located in the neighborhood of capstan shaft 28 mentioned above. Pinch roller 47 is swingably supported by one end of pinch lever 48. As is shown in FIG. 5A, this pinch lever 48 is swingably supported by main chassis 10 by means of shaft 48a. Pinch lever 48 is swung in association with the above-mentioned mode-switching cams by a linking mechanism (not shown). As a result of the swing of pinch lever 48, pinch roller 47 supported at one end of lever 48 is pressed against capstan shaft 28, with tape T interposed.

FIG. 5A shows the state where tape cassette C has been set in the predetermined loading position in the VTR by front loading mechanism 13. Cassette C is shaped like a thin rectangular box, and two tape-takeout ports 50 and 51 are formed in the front face of cassette C. These tape-takeout ports 50 and 51 are obtained by providing slits in the front face of cassette C in the thickness direction thereof (i.e., the widthwise direction of tape T). A plurality of indentations 52, 53, 54 and 55 are formed in the front face of cassette C by selectively removing the front portions of cassette C in the thickness direction thereof (i.e., in the widthwise direction of tape T). Indentations 52 and 53 serve as tape-takeout sections, and first and second guide holes 38a and 38b mentioned above are located in correspondence to indentations 52 and 53, respectively.

Indentation 55 is formed in such a manner as to allow a cover-opening/closing member (not shown) to pass therethrough. More specifically, the cover-opening/closing member passes through indentation 55 when front loading mechanism 13 is lowering cassette C toward the predetermined loading position in the direction perpendicular to the drawing sheet of FIG. 5A, whereby a cover (not shown) provided for the front face of cassette C is opened.

Indentation 54 is formed in such a manner as to guide or position capstan shaft 28. Tape posture control pole 56 is advanced into indentation 54 by a tape posture control pole-moving mechanism. This pole-moving mechanism comprises swing lever 57 and second mode-switching cam 32b. More specifically, tape posture control pole 56 stands upright at one end (i.e., swingable end) of lever 57. This lever 57 is attached to shaft 58 standing upright on main chassis 10, such that lever 57 is horizontally swingable. Pin 59 is located at the other end of lever 57 and engages with the cam groove formed in second mode-switching cam 32b. Second mode-switching cam 32b is arranged coaxial with first mode-switching cam 32a and is rotatable by the same angle as first mode-switching cam 32a.

In FIG. 5A, reference numeral 60 denotes an audio and control head, and reference numeral 61 denotes a tape guide pole standing upright on main chassis 10.

FIG. 5B shows the state where tape T, pulled out of cassette C, has been brought into contact with rotating cylinder 37 by the tape-loading mechanism. As is shown in FIG. 5B, tape T is fed from supply reel 62 to take-up reel 64 by way of the following structural elements: pin P3 formed inside cassette C; tape-takeout port 50; tension pole 63; guide roller 41a; slanted post 40a; rotating cylinder 37; slanted post 40b; guide roller 41b; audio and control head 60; tape guide pole 61; capstan shaft 28; tape posture control pole 56; tape-takeout port 51; pin P1; and pin P2.

Even if pin P3 is rickety or slanted, the posture of tape T can be maintained in a stable manner, due to the provision of tension pole 63 standing upright with high precision. Further, even if pins P1 and P2 are rickety or slanted, the stable posture of tape T is not adversely affected since tape posture control pole 56 is located close to tape-takeout port 51.

Figure 6:
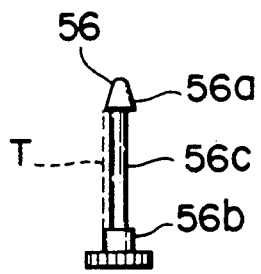
FIG. 6 is a front view of the tape posture control pole employed in the tape guide apparatus shown in FIG. 5A.

As is shown in FIG. 6, tape posture control pole 56 includes small-diameter portion 56c located between large-diameter portions 56a and 56b, to thereby prevent tape T from slipping in the widthwise direction thereof.

Figure 7:
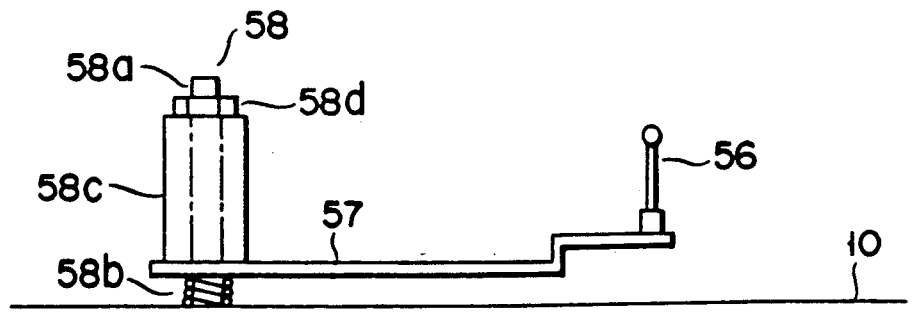
FIG. 7 is a side view illustrating the fixing structure of a swing lever.
Figure 8:
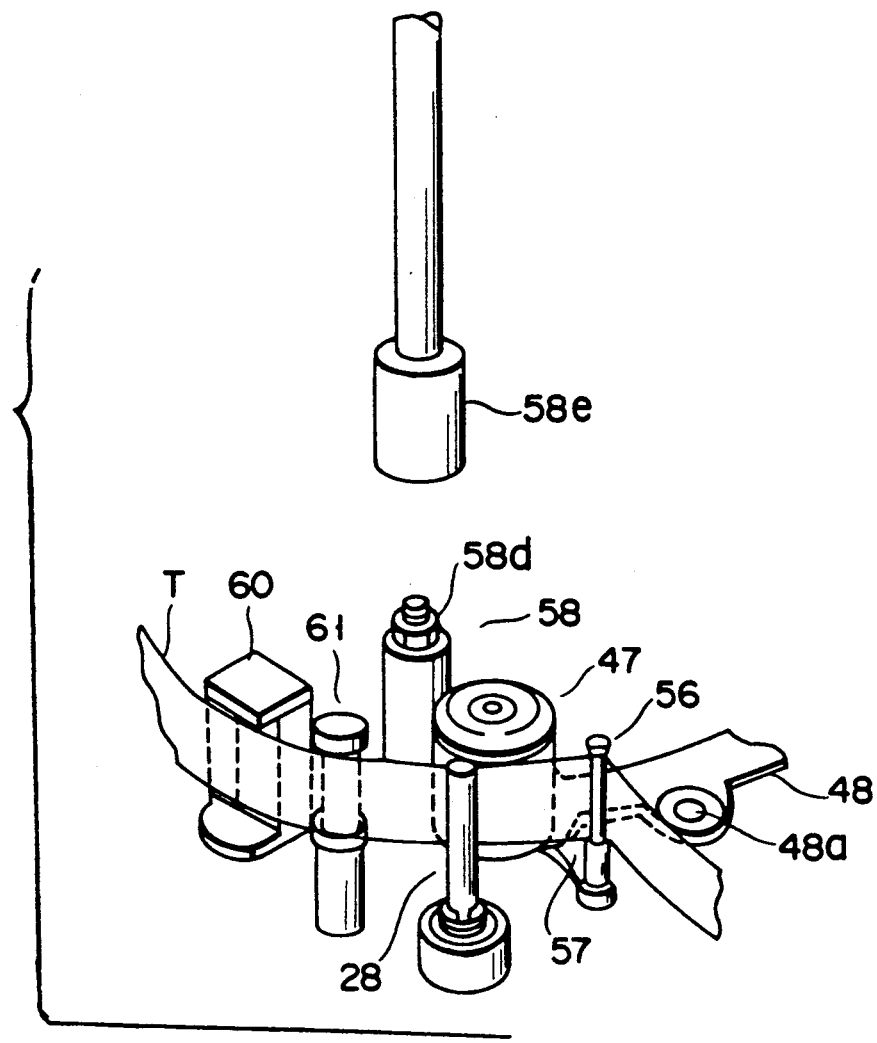
FIG. 8 is a perspective view illustrating how the tape posture control pole is adjusted in height.

Further, as is shown in FIG. 7, shaft 58 of swing lever 57 is constituted by screw 58a inserted from the reverse side of main chassis 10. Screw 58a extends through spring 58b, swing lever 57 and spacer 58c, and is secured to main chassis 10 by means of nut 58d. Nut 58d is fastened or loosened with reference to main chassis 10 by use of adjustment screwdriver 58e, as is shown in FIG. 8. By adjusting the fastening condition of nut 58d, the level of swing lever 57 can be determined with reference to the surface of main chassis 10. As a result of the adjustment of the level of swing lever 57, the vertical position of tape posture control pole 56 is also adjusted with reference to the upper surface of main chassis 10. Therefore, the vertical position of tape posture control pole 56 can be determined in such a manner as to permit tape T to be fed with a desirable posture. It should be noted that nut 58d is not hidden under cassette C located at the loading position since shaft 58 (namely, screw 58a) is spaced sufficiently from the loading position of cassette T. Therefore, the vertical position of tape posture control pole 56 with reference to the upper surface of main chassis 10 can be adjusted by use of driver 58e even when tape T is being fed. It is thus possible to make very high adjustment.

Figure 9:
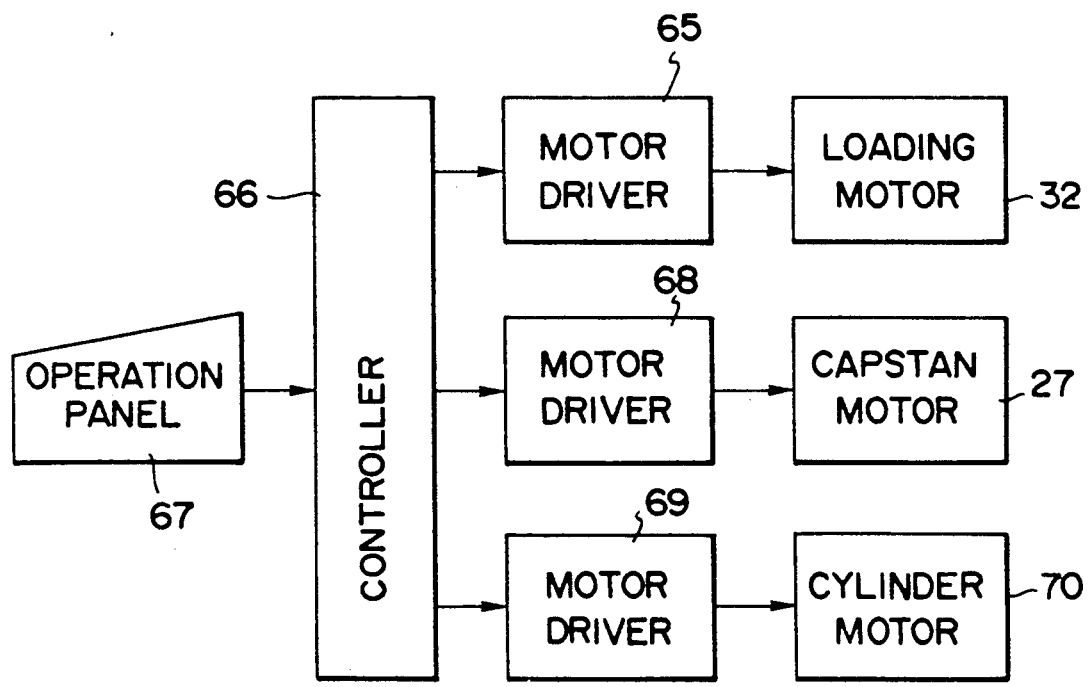
FIG. 9 is a block circuit diagram of the electric circuit of the VTR illustrated in FIG. 2A.

Second mode-switching cam 32b, used for swinging lever 57 which supports tape position control pole 56, is coaxial with first mode-switching cam 32a and other mode-switching cams. The mode-switching cams are rotated within the same angular range by loading motor 32, and their angles of rotation are determined in accordance with the operation modes of the VTR. As is shown in FIG. 9, loading motor 32 is driven by motor driver 65 under the control of controller 66. In accordance with the user's operation of control panel 67, controller 66 determines an operation mode of the VTR. Controller 66 cause the mode-switching cams to be rotated by the angle corresponding to the determined operation mode. Further, controller 66 controls motor driver 68 in accordance with the determined operation mode, to thereby drive capstan motor 27. The torque of capstan motor 27 is selectively transmitted to capstan shaft 28, supply reel 62, take-up reel 64, etc. Still further, controller 66 controls motor driver 69 in accordance with the determined operation mode, to thereby drive cylinder motor 70 to rotate cylinder 37.

As mentioned above, according to the present invention, tape posture control pole 56 is provided for the VTR such that pole 56 is located in the neighborhood of tape-takeout port 51, independently of tension pole 63 located in the neighborhood of tape-takeout portion 50. Therefore, the tape posture can be maintained in a very stable manner. Moreover, since the mechanism for adjusting the vertical position of pole 56 is located sufficiently away from cassette C. Since, therefore, the vertical position of pole 56 can be adjusted even in the condition where tape T is being fed, it is possible to make very high adjustment.

The above embodiment was described, referring to the case where second mode-switching cam 32b is used for the driving of lever 57 which supports tape posture control pole 56. However, the present invention is in no way limited to this. It is only required in the present invention that tape posture control pole 56 be brought into contact with the inner side of tape T in the manner shown in FIG. 6, when the tape loading has been completed. For example, therefore, lever 57 for supporting pole 56 may be driven by providing either a plunger or an operating lever at a location sufficiently away from cassette C.

What is claimed is:

1. A tape guide apparatus comprising:
   a tape posture control post for controlling widthwise inclination of a tape;
   a tape posture control post-moving means for:
   moving said tape posture control post into a tape-takeout section of a tape cassette containing a tape when said tape cassette is located at a predetermined loading position,
   moving said tape posture control post away from said tape cassette, to allow drawing of said tape from said tape cassette through said tape-takeout section, and
   moving said tape posture control post through said tape-takeout section upon drawing of said tape from said tape cassette, so as to allow positioning of said tape posture control post adjacent and parallel to a guide post of said tape cassette, placing of said tape posture control post in contact with an inner side of said tape drawn from said tape cassette through said tape-takeout section, and controlling of the widthwise inclination of said tape by said tape posture control post; and means for adjusting the position of said tape posture control post in the widthwise direction of the tape.

2. The apparatus according to claim 1, wherein said adjusting means is so located as to permit adjusting of the position of the tape posture control post, with the tape cassette located at the predetermined loading position, whereby the position of the tape posture control post can be adjusted even after the tape has been pulled out through the tape-takeout section and the tape posture control post has been moved in contact with the inner side of the tape.

3. The apparatus according to claim 2, wherein said tape posture control post-moving means further includes:

a mode-switching cam having a cam groove formed therein and rotatable within a predetermined angular range in accordance with an operation mode; and a swing lever having a swingable one end on which the tape posture control post stands upright, another end engaging with the cam groove of the mode-switching cam, and a shaft located between the swingable one end and said another end, said swing lever swinging the swingable one end with the shaft as a center of swing in accordance with rotation of the mode-switching cam, and said adjusting means being provided for the shaft.

4. The apparatus according to claim 3, wherein said tape posture control post includes a small-diameter portion whose height is substantially equal to the width of the tape, and large-diameter portions located at respective ends of the small-diameter portion.

* * * * *